United States Patent
Liu et al.

(10) Patent No.: US 9,983,546 B2
(45) Date of Patent: May 29, 2018

(54) DISPLAY APPARATUS AND VISUAL DISPLAYING METHOD FOR SIMULATING A HOLOGRAPHIC 3D SCENE

(71) Applicant: Shenzhen Cloud Cube Information Tech Co., Ltd., Shenzhen, Guangdong Province (CN)

(72) Inventors: Meihong Liu, Shenzhen (CN); Wei Gao, Shenzhen (CN)

(73) Assignee: SHENZHEN MAGIC EYE TECHNOLOGY CO., LTD., Shenzhen (CN)

( * ) Notice: Subject to any disclaimer, the term of this patent is extended or adjusted under 35 U.S.C. 154(b) by 534 days.

(21) Appl. No.: 14/415,603

(22) PCT Filed: Apr. 22, 2014

(86) PCT No.: PCT/CN2014/075951
§ 371 (c)(1),
(2) Date: Jan. 18, 2015

(87) PCT Pub. No.: WO2014/146619
PCT Pub. Date: Sep. 25, 2014

(65) Prior Publication Data
US 2015/0227112 A1     Aug. 13, 2015

(30) Foreign Application Priority Data
Mar. 22, 2013     (CN) .......................... 2013 1 0094938

(51) Int. Cl.
*G03H 1/08*     (2006.01)
*G02B 27/22*     (2018.01)
(Continued)

(52) U.S. Cl.
CPC ......... *G03H 1/0866* (2013.01); *G02B 27/225* (2013.01); *G03H 1/0005* (2013.01);
(Continued)

(58) Field of Classification Search
CPC .............. G03H 1/0866; G03H 1/0005; G03H 2001/0088; H04N 13/0207; H04N 13/0409; H04N 13/0484; G02B 27/225
See application file for complete search history.

(56) References Cited

U.S. PATENT DOCUMENTS 5,847,793 A * 12/1998 Itoh .................... G02F 1/133512
349/110
6,163,336 A * 12/2000 Richards ............ G02B 27/0093
348/42

(Continued)

FOREIGN PATENT DOCUMENTS

CN     101072366 A     11/2007
CN     201966999 U     9/2011
(Continued)

*Primary Examiner* — Joseph Suh (57) ABSTRACT

A display apparatus and a visual displaying method for simulating a holographic 3D scene are provided. The display apparatus comprises: a display screen; two front-facing 3D cameras, being configured to capture human-eye 3D position information; a 3D human-eye tracking algorithm processing unit, being configured to generate a first signal and a second signal according to the human-eye 3D position information; a 3D scene generating unit, being configured to receive the first signal, render and acquire the corresponding left visual-channel 3D scene and the corresponding right visual-channel 3D scene according to the first signal; and an electronic grating, being configured to receive the second signal and adjust the working angle according to the second signal so that the left visual-channel 3D scene is incident into the left eye of the user and the right visual-channel 3D scene is incident into the right eye of the user.

8 Claims, 4 Drawing Sheets

(51) Int. Cl.
*H04N 13/04* (2006.01)
*G03H 1/00* (2006.01)
*H04N 13/02* (2006.01)

(52) U.S. Cl.
CPC ..... *H04N 13/0207* (2013.01); *H04N 13/0409* (2013.01); *H04N 13/0484* (2013.01); *G03H 2001/0088* (2013.01)

(56) References Cited

U.S. PATENT DOCUMENTS

| | | | | |
|---|---|---|---|---|
| 6,757,422 | B1* | 6/2004 | Suzuki | G02B 27/0093 348/42 |
| 2002/0190652 | A1* | 12/2002 | Do | H01J 9/02 313/587 |
| 2005/0117186 | A1* | 6/2005 | Li | G02B 27/0093 359/15 |
| 2005/0207486 | A1* | 9/2005 | Lee | H04N 13/0239 375/240.01 |
| 2007/0002304 | A1* | 1/2007 | Saltsman | G01S 5/16 356/3.1 |
| 2008/0269965 | A1* | 10/2008 | Luk-Paszyc | B63B 9/08 701/13 |
| 2009/0256837 | A1* | 10/2009 | Deb | G06T 19/003 345/419 |
| 2010/0231734 | A1* | 9/2010 | Cai | H04N 5/23206 348/218.1 |
| 2010/0232016 | A1* | 9/2010 | Landa | G02B 5/1814 359/466 |
| 2011/0096254 | A1* | 4/2011 | Ikeda | G02F 1/13306 349/33 |
| 2012/0200495 | A1* | 8/2012 | Johansson | G06F 3/011 345/156 |
| 2012/0200676 | A1* | 8/2012 | Huitema | H04N 13/0022 348/51 |
| 2012/0249758 | A1* | 10/2012 | Saito | H04N 5/232 348/54 |
| 2013/0038803 | A1* | 2/2013 | Ma | G02F 1/133711 349/15 |
| 2013/0077013 | A1* | 3/2013 | Yamazaki | G02B 3/14 349/57 |
| 2013/0077154 | A1* | 3/2013 | Popovich | G02B 27/2214 359/316 |
| 2013/0156265 | A1* | 6/2013 | Hennessy | A61B 3/113 382/103 |
| 2013/0241930 | A1* | 9/2013 | Williams | G06T 15/04 345/426 |
| 2013/0314421 | A1* | 11/2013 | Kim | G09B 5/065 345/427 |
| 2013/0314628 | A1* | 11/2013 | Park | G02F 1/1334 349/15 |
| 2014/0055692 | A1* | 2/2014 | Kroll | G02F 1/1347 349/15 |
| 2014/0098010 | A1* | 4/2014 | Travis | G02B 26/005 345/32 |
| 2014/0132595 | A1* | 5/2014 | Boulanger | G06T 19/20 345/419 |
| 2014/0181910 | A1* | 6/2014 | Fingal | H04L 63/107 726/4 |
| 2014/0267772 | A1* | 9/2014 | Morin | H04N 5/232 348/169 |
| 2014/0327613 | A1* | 11/2014 | Chessa | H04N 13/0014 345/156 |
| 2014/0333582 | A1* | 11/2014 | Huo | G02F 1/13338 345/174 |

FOREIGN PATENT DOCUMENTS

| | | |
|---|---|---|
| CN | 202172467 U | 3/2012 |
| CN | 102665087 A | 9/2012 |
| CN | 202453584 U | 9/2012 |
| CN | 102710956 A | 10/2012 |
| CN | 103248905 A | 8/2013 |

* cited by examiner

DISPLAY APPARATUS AND VISUAL DISPLAYING METHOD FOR SIMULATING A HOLOGRAPHIC 3D SCENE

CROSS REFERENCE TO RELATED APPLICATIONS

The present application is a 35 U.S.C. § 371 National Phase conversion of International (PCT) Patent Application No. PCT/CN2014/075951, filed on Apr. 22, 2014, the disclosure of which is incorporated by reference herein. The PCT International Patent Application was filed and published in Chinese.

FIELD OF THE INVENTION

The present disclosure relates to the technical field of displaying technologies, and more particularly, to a display apparatus and a visual displaying method for simulating a holographic three-dimensional (3D) scene.

BACKGROUND OF THE INVENTION

The conventional multi-viewpoint 3D televisions and multi-viewpoint craft pictures allow users to watch TV programs having multiple visual channels at multiple viewpoints within a specific narrow range. However, they have a shortcoming that the number of the visual channels is very limited (generally there are eight or slightly more viewpoints), and during the capturing process, eight video cameras are needed to capture 3D pictures and to restore them.

With advancement of the modern science and technologies, all devices need to be miniaturized and sophisticated, but the conventional display devices cannot satisfy this need. Accordingly, there exists an increasing demand for a new display technology to solve this problem.

To solve the aforesaid technical problem, the present disclosure provides a display apparatus and a visual displaying method for simulating a holographic 3D scene.

SUMMARY OF THE INVENTION

A primary objective of the present disclosure is to provide a display apparatus and a visual displaying method for simulating a holographic 3D scene. Specifically, human-eye 3D position information of human eyes are captured by using two front-facing 3D cameras, spatial coordinates of the human eyes are calculated according to the human-eye 3D position information, then a 3D scene generating unit is controlled according to the spatial coordinates to render and acquire a corresponding left visual-channel 3D scene and a corresponding right visual-channel 3D scene, and a working angle of an electronic grating is controlled according to the spatial coordinates so that the left visual-channel 3D scene is incident into the left eye of the user and the right visual-channel 3D scene is incident into the right eye of the user.

To solve the aforesaid technical problem, a technical solution adopted in the present disclosure is to provide a display apparatus for simulating a holographic 3D scene, which comprises:

a display screen;

a first front-facing camera and a second front-facing camera, wherein the first front-facing camera is disposed at an upper-left corner of the display screen, the second front-facing camera is disposed at an upper-right corner of the display screen, and the first front-facing camera and the second front-facing camera are adapted to capture human-eye 3D position information of human eyes;

a 3D human-eye tracking algorithm processing unit electrically connected to the first front-facing camera and the second front-facing camera, being configured to, according to the human-eye 3D position information, generate a first signal for controlling a 3D scene generating unit to generate 3D scenes corresponding to a left visual channel and a right visual channel respectively and a second signal for controlling a working angle of an electronic grating;

the 3D scene generating unit, being electrically connected to the display screen and configured to receive the first signal, render and acquire the corresponding left visual-channel 3D scene and the corresponding right visual-channel 3D scene according to the first signal, and transmit the left visual-channel 3D scene and the right visual-channel 3D scene to the display screen for displaying; and the electronic grating, being configured to receive the second signal and adjust the working angle according to the second signal so that the left visual-channel 3D scene is incident into the left eye of the user and the right visual-channel 3D scene is incident into the right eye of the user.

Preferably, the first front-facing camera is configured to acquire a left-eye format picture of the human-eye position; the second front-facing camera is configured to capture a right-eye format picture of the human-eye position; and the 3D human-eye tracking algorithm processing unit calculates an angle $\alpha$ included between a projection of a connection line, which connects a center point of the human eye and a center point of the display screen, on an XY plane of a spatial rectangular coordinate system O-XYZ and a Y axis as well as an angle $\beta$ included between the connection line, which connects the center point of the human eye and the center point of the display screen, and the projection according to differences in the human-eye position between the left-eye format picture and the right-eye format picture, wherein an origin O of the spatial rectangular coordinate system O-XYZ is located at the center point of the display screen, an X axis of the spatial rectangular coordinate system O-XYZ is parallel to a connection line that connects a center point of a left edge and a center point of a right edge of the display screen, and the Y axis of the spatial rectangular coordinate system O-XYZ is perpendicular to the connection line that connects the center point of the left edge and the center point of the right edge of the display screen.

Preferably, the first signal is a signal comprising the parameters $\alpha$ and $\beta$, and the second signal is a signal comprising the parameter $\alpha$.

Preferably, the 3D scene generating unit controls an OpenGL3D scene rendering camera to move to a position corresponding to the parameters $\alpha$ and $\beta$, then controls the OpenGL3D scene rendering camera to move leftwards by an x distance to render and acquire the left visual-channel 3D scene, and then moves the OpenGL3D scene rendering camera rightwards by a 2x distance to render and acquire the right visual-channel 3D scene, wherein the parameter x is a preset parameter related to the depth of field.

Preferably, the 3D scene generating unit controls a DirectX3D scene rendering camera to move to a position corresponding to the parameters $\alpha$ and $\beta$, then controls the DirectX3D scene rendering camera to move leftwards by an x distance to render and acquire the left visual-channel 3D scene, and then moves the DirectX3D scene rendering camera rightwards by a 2x distance to render and acquire the right visual-channel 3D scene, wherein the parameter x is a preset parameter related to the depth of field.

Preferably, the electronic grating comprises: a first glass plate, a second glass plate, a liquid crystal layer and a control unit. The first glass plate is provided with a first polarizer on a first surface thereof and a first ITO conductive layer on a second surface thereof that is opposite to the first polarizer; the second glass plate is provided with a second polarizer on a first surface thereof and a second ITO conductive layer on a second surface thereof that is opposite to the second polarizer; the first polarizer has a polarization direction perpendicular to that of the second polarizer; the second ITO conductive layer comprises a plurality of ITO electrodes arranged at equal intervals and black insulation bars disposed between adjacent ones of the ITO electrodes; the liquid crystal layer is sandwiched between the first ITO conductive layer and the second ITO conductive layer; and the control unit is configured to control ON/OFF of an alternating current (AC) voltage between the first ITO conductive layer and each of the ITO electrodes according to the second signal so that bright and dark stripes of the grating change in position adaptively to adapt to the human-eye position and, thus, the left visual-channel 3D scene displayed on the display screen is incident into the left eye of the user via the electronic grating and the right visual-channel 3D scene displayed on the display screen is incident into the right eye of the user via the electronic grating.

Preferably, any of the display apparatuses described above is a computer.

Preferably, any of the display apparatuses described above is a mobile phone.

To solve the aforesaid technical problem, another technical solution provided by the present disclosure is to provide a visual displaying method for simulating a holographic 3D scene, which comprises:

capturing human-eye 3D position information of human eyes by using two front-facing 3D cameras of a display screen;

calculating spatial coordinates of the human eyes by a 3D human-eye tracking algorithm processing unit according to the human-eye 3D position information;

rendering and acquiring a corresponding left visual-channel 3D scene and a corresponding right visual-channel 3D scene according to the spatial coordinates of the human eyes, and transmitting the left visual-channel 3D scene and the right visual-channel 3D scene to the display screen for displaying; and adjusting a working angle of an electronic grating according to the spatial coordinates of the human eyes so that the left visual-channel 3D scene displayed on the display screen is incident into the left eye of the user via the electronic grating and the right visual-channel 3D scene displayed on the display screen is incident into the right eye of the user via the electronic grating.

Preferably, the step of calculating spatial coordinates of the human eyes by a 3D human-eye tracking algorithm processing unit according to the 3D position information of the human eyes comprises:

the 3D human-eye tracking algorithm processing unit calculates an angle $\alpha$ included between a projection of a connection line, which connects a center point of the human eye and a center point of the display screen, on an XY plane of a spatial rectangular coordinate system O-XYZ and a Y axis as well as an angle $\beta$ included between the connection line, which connects the center point of the human eye and the center point of the display screen, and the projection according to differences in the human-eye position between the left-eye format picture and the right-eye format picture, wherein an origin O of the spatial rectangular coordinate system O-XYZ is located at the center point of the display screen, an X axis of the spatial rectangular coordinate system O-XYZ is parallel to a connection line that connects a center point of a left edge and a center point of a right edge of the display screen, and a Y axis of the spatial rectangular coordinate system O-XYZ is perpendicular to the connection line that connects the center point of the left edge and the center point of the right edge of the display screen.

Preferably, the step of rendering and acquiring a corresponding left visual-channel 3D scene and a corresponding right visual-channel 3D scene according to the spatial coordinates of the human eyes, and transmitting the left visual-channel 3D scene and the right visual-channel 3D scene to the display screen for displaying comprises:

the 3D scene generating unit controls an OpenGL3D scene rendering camera to move to a position corresponding to the parameters $\alpha$ and $\beta$, then controls the OpenGL3D scene rendering camera to move leftwards by an x distance to render and acquire the left visual-channel 3D scene, and then moves the OpenGL3D scene rendering camera rightwards by a 2x distance to render and acquire the right visual-channel 3D scene, wherein the parameter x is a preset parameter related to the depth of field.

Preferably, the step of rendering and acquiring a corresponding left visual-channel 3D scene and a corresponding right visual-channel 3D scene according to the spatial coordinates of the human eyes, and transmitting the left visual-channel 3D scene and the right visual-channel 3D scene to the display screen for displaying comprises:

the 3D scene generating unit controls a DirectX3D scene rendering camera to move to a position corresponding to the parameters $\alpha$ and $\beta$, then controls the DirectX3D scene rendering camera to move leftwards by an x distance to render and acquire the left visual-channel 3D scene, and then moves the DirectX3D scene rendering camera rightwards by a 2x distance to render and acquire the right visual-channel 3D scene, wherein the parameter x is a preset parameter related to the depth of field.

The present disclosure has the following benefits: as compared to the prior art, the display apparatus and the visual displaying method for simulating a holographic 3D scene according to the present disclosure capture human-eye 3D position information of human eyes by using two front-facing 3D cameras, calculate spatial coordinates of the human eyes according to the human-eye 3D position information, control the 3D human-eye tracking algorithm processing unit according to the spatial coordinates of the human eyes to generate a first signal for controlling the 3D scene generating unit to generate 3D scenes corresponding to the left visual channel and the right visual channel respectively and a second signal for controlling the working angle of the electronic grating so that the left visual-channel 3D scene is incident into the left eye of the user and the right visual-channel 3D scene is incident into the right eye of the user. Therefore, the present disclosure allows to see different 3D images at different view angles just as in the real world, thus achieving holographic displaying of an object or scene.

DETAILED DESCRIPTION OF THE INVENTION

Figure 1:
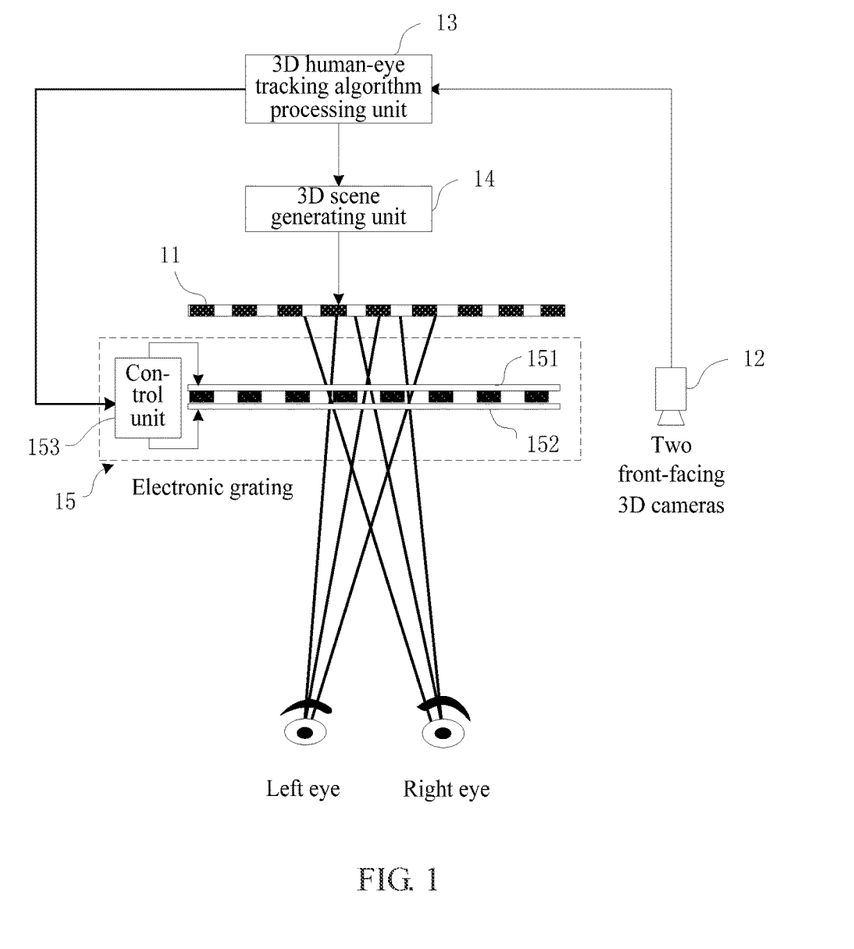
FIG. 1 is a schematic view illustrating operation principles of a display apparatus for simulating a holographic 3D scene of the present disclosure.

Please refer to FIG. 1, which is a schematic view illustrating operation principles of a display apparatus for simulating a holographic 3D scene of the present disclosure. As shown in FIG. 1, the display apparatus for simulating a holographic 3D scene of the present disclosure comprises: a display screen 11, two front-facing 3D cameras 12 (including a first front-facing camera and a second front-facing camera), a 3D human-eye tracking algorithm processing unit 13, a 3D scene generating unit 14 and an electronic grating 15. Preferably, the display screen 11 described in this embodiment may be an LCD display screen and may also be a TFT display screen, and the present disclosure has no limitation on this.

Figure 2A:
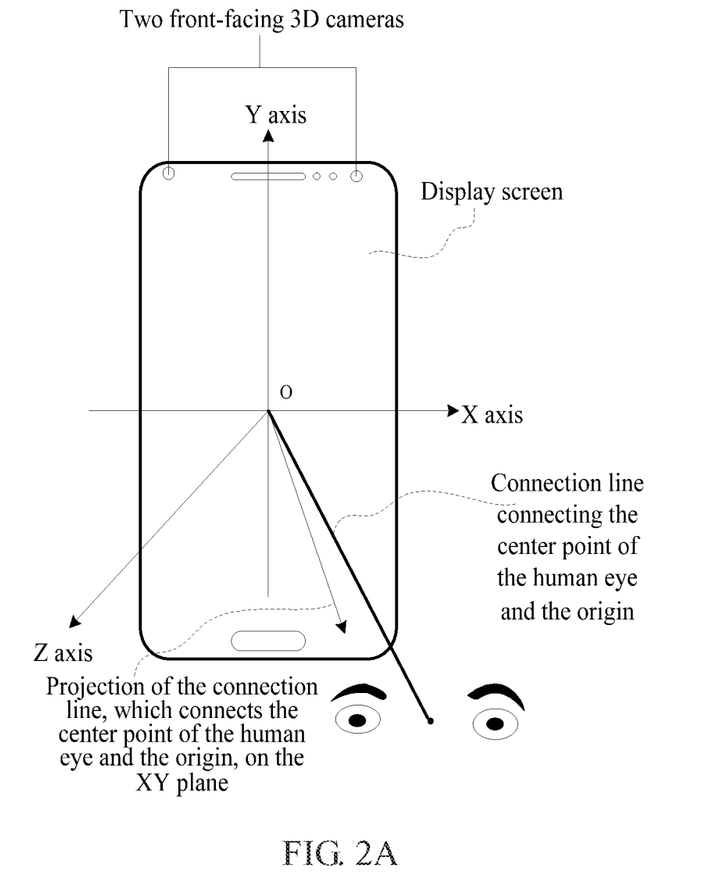
FIGS. 2A-2B depict a schematic structural view of a preferred embodiment of the display apparatus for simulating a holographic 3D scene of the present disclosure.

Please refer to FIG. 2A, which is a schematic structural view of a first preferred embodiment of the display apparatus for simulating a holographic 3D scene of the present disclosure. Then, as shown in FIG. 2A, the first front-facing camera is disposed at an upper-left corner of the display screen 11; the second front-facing camera is disposed at an upper-right corner of the display screen 11; and the first front-facing camera and the second front-facing camera are adapted to capture human-eye 3D position information of human eyes. The 3D human-eye tracking algorithm processing unit 13, which is electrically connected to the first front-facing camera and the second front-facing camera, is configured to, according to the human-eye 3D position information, generate a first signal for controlling the 3D scene generating unit 14 to generate 3D scenes corresponding to a left visual channel and a right visual channel respectively and a second signal for controlling a working angle of the electronic grating 15. The 3D scene generating unit 14, which is electrically connected to the display screen 11, is configured to receive the first signal, render and acquire the corresponding left visual-channel 3D scene and the corresponding right visual-channel 3D scene according to the first signal, and transmit the left visual-channel 3D scene and the right visual-channel 3D scene to the display screen 11 for displaying. The electronic grating 15 is configured to receive the second signal and adjust the working angle according to the second signal so that the left visual-channel 3D scene is incident into the left eye of the user and the right visual-channel 3D scene is incident into the right eye of the user.

In the embodiments of the present disclosure, as long as human eyes move within the display range of the display apparatus and also move within the capture range of the two front-facing 3D cameras, a visual effect of a holographic 3D scene can be acquired.

Referring still to FIG. 2A, in this embodiment, the first front-facing camera is configured to acquire a left-eye format picture of the human-eye position, and the second front-facing camera is configured to capture a right-eye format picture of the human-eye position; the 3D human-eye tracking algorithm processing unit calculates an angle α between a projection of a first connection line, which connects a midpoint between the left and right eyes and a center point of the display screen, on an XY plane of a spatial rectangular coordinate system O-XYZ and a Y axis and calculating an angle β between the first connection line, which connects the midpoint between the left and right eyes and the center point of the display screen, and the projection of the first connection line on the XY plane, wherein the first connection line is projected to the XY plane at a right angle, and wherein each of the angle α and angle β is calculated according to differences in positions of the left and right eyes of the user in the left-eye format picture and those in the right-eye format picture.

Where, an origin O of the spatial rectangular coordinate system O-XYZ is located at the center point of the display screen, an X axis of the spatial rectangular coordinate system O-XYZ is parallel to a second connection line that connects a center point of a left edge and a center point of a right edge of the display screen, and a Y axis of the spatial rectangular coordinate system O-XYZ is parallel to a third connection line that connects a center point of a top edge and a center point of a bottom edge of the display screen.

In this embodiment, the first signal is a signal comprising the parameters α and β, and the second signal is a signal comprising the parameter α.

In a preferred embodiment of the present disclosure, the 3D scene generating unit controls an OpenGL3D scene rendering camera to move to a position corresponding to the parameters α and β, then controls the OpenGL3D scene rendering camera to move leftwards by an x distance to render and acquire the left visual-channel 3D scene, and then moves the OpenGL3D scene rendering camera rightwards by a 2x distance to render and acquire the right visual-channel 3D scene, where the parameter x is a preset parameter related to the depth of field.

Figure 2B:
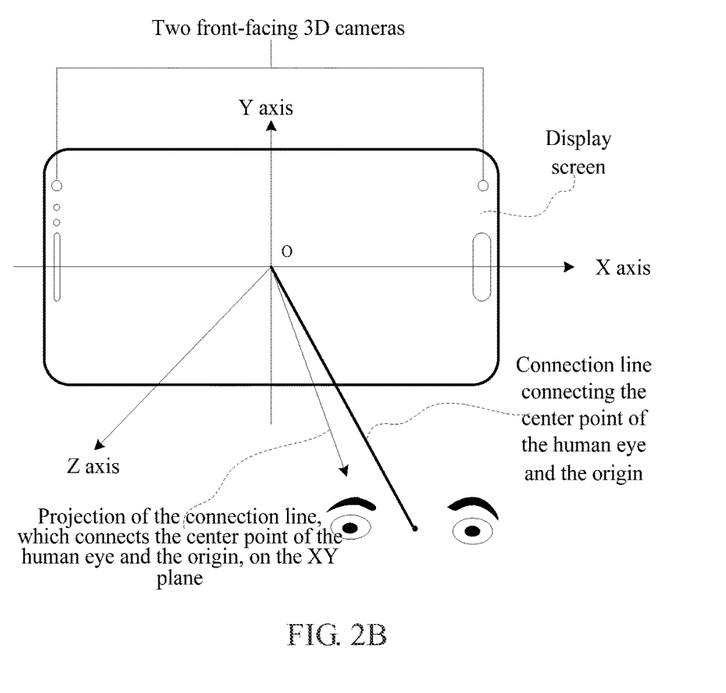

Please refer to FIG. 2B, which is a schematic structural view of a second preferred embodiment of the display apparatus for simulating a holographic 3D scene of the present disclosure. FIG. 2B differs from FIG. 2A in that: the display screen in FIG. 2A is a portrait-type display screen, with the corresponding two front-facing 3D cameras being preferably disposed at an upper-left corner and an upper-right corner of the portrait-type display screen 11 respectively; however, the display screen in FIG. 2B is a landscape-type display screen, with the corresponding two front-facing 3D cameras being preferably disposed at an upper-right corner and a lower right corner of the display screen 11 respectively. The spatial rectangular coordinate system O-XYZ is adaptively adjusted according to the display orientation of the display screen.

In other practical applications of the present disclosure, the first front-facing camera and the second front-facing camera may also be disposed at other positions depending on specific applications, and the present disclosure has no limitation on this.

In other embodiments of the present disclosure, the spatial rectangular coordinate system O-XYZ may be created as needed, and is not limited to what described in the aforesaid embodiment.

In another preferred embodiment of the present disclosure, the 3D scene generating unit controls the DirectX3D scene rendering camera to move to a position corresponding to the parameters α and β, then controls the DirectX3D scene rendering camera to move leftwards by an x distance to render and acquire the left visual-channel 3D scene, and then moves the DirectX3D scene rendering camera rightwards by a 2x distance to render and acquire the right visual-channel 3D scene, where the parameter x is a preset parameter related to the depth of field.

Of course, in other preferred embodiments of the present disclosure, the 3D scene generating unit 14 may also use other types of scene rendering cameras to implement the scene rendering function of the OpenGL3D scene rendering camera and the DirectX3D scene rendering camera, and the present disclosure has no limitation on this.

Referring back to FIG. 1, the electronic grating 15 comprises: a first glass plate (not depicted), a second glass plate (not depicted), a liquid crystal layer (not labeled) and a control unit 153. The first glass plate is provided with a first polarizer (not depicted) on a first surface thereof and a first ITO conductive layer 151 on a second surface thereof that is opposite to the first polarizer; the second glass plate is provided with a second polarizer (not depicted) on a first surface thereof and a second ITO conductive layer 152 on a second surface thereof that is opposite to the second polarizer; the first polarizer has a polarization direction perpendicular to that of the second polarizer; the second ITO conductive layer 152 comprises a plurality of ITO electrodes arranged at equal intervals and black insulation bars disposed between adjacent ones of the ITO electrodes; the liquid crystal layer is sandwiched between the first ITO conductive layer 151 and the second ITO conductive layer 152; and the control unit is configured to control ON/OFF of an alternating current (AC) voltage between the first ITO conductive layer 151 and each of the ITO electrodes according to the second signal so that bright and dark stripes of the grating change in position adaptively to adapt to the human-eye position and, thus, the left visual-channel 3D scene displayed on the display screen 11 is incident into the left eye of the user via the electronic grating 15 and the right visual-channel 3D scene displayed on the display screen 11 is incident into the right eye of the user via the electronic grating 15.

Of course, in other embodiments of the present disclosure, positions of the first ITO conductive layer 151 and the second ITO conductive layer 152 may be interchanged with each other, and this is also covered within the scope of the present disclosure.

A preferred embodiment of the display apparatus for simulating a holographic 3D scene of the present disclosure is a computer, and another preferred embodiment of the present disclosure is a mobile phone. Of course, in other embodiments of the present disclosure, the display apparatus for simulating a holographic 3D may also be some other display apparatus.

Figure 3:
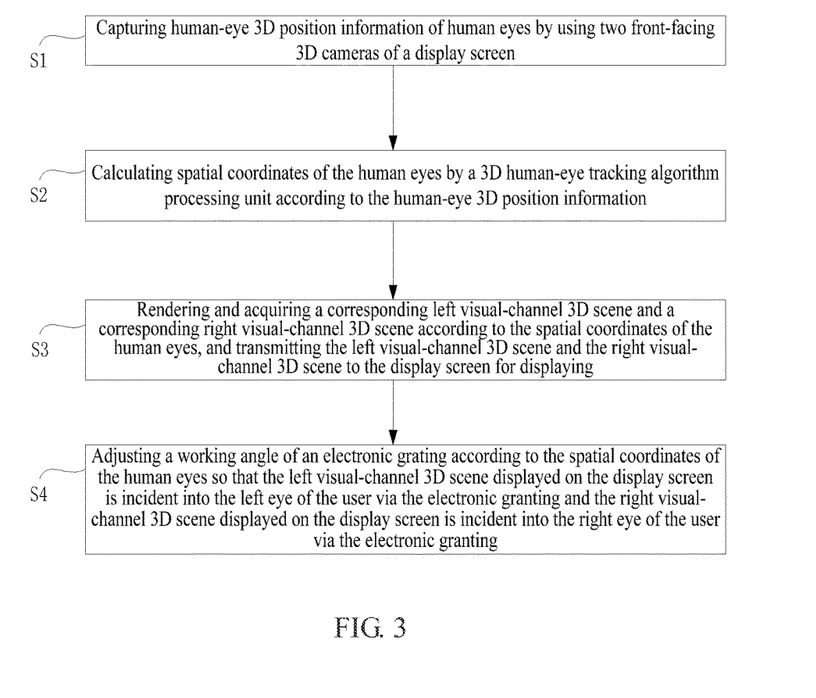
FIG. 3 is a flowchart diagram of a visual displaying method for simulating a holographic 3D scene of the present disclosure.

Please refer to FIG. 3, which is a flowchart diagram of a visual displaying method for simulating a holographic 3D scene of the present disclosure. The flowchart diagram comprises:

S1. capturing human-eye 3D position information of human eyes by using two front-facing 3D cameras of a display screen;

S2. calculating spatial coordinates of the human eyes by a 3D human-eye tracking algorithm processing unit according to the human-eye 3D position information;

S3. rendering and acquiring a corresponding left visual-channel 3D scene and a corresponding right visual-channel 3D scene according to the spatial coordinates of the human eyes, and transmitting the left visual-channel 3D scene and the right visual-channel 3D scene to the display screen for displaying; and S4. adjusting a working angle of an electronic grating according to the spatial coordinates of the human eyes so that the left visual-channel 3D scene displayed on the display screen is incident into the left eye of the user via the electronic grating and the right visual-channel 3D scene displayed on the display screen is incident into the right eye of the user via the electronic grating.

Preferably, the step S2 comprises:

The 3D human-eye tracking algorithm processing unit calculates an angle $\alpha$ between a projection of a first connection line, which connects a midpoint between the left and right eyes and a center point of the display screen, on an XY plane of a spatial rectangular coordinate system O-XYZ and a Y axis, and calculating an angle $\beta$ between the first connection line, which connects the midpoint between the left and right eyes and the center point of the display screen, and the projection of the first connection line on the XY plane, wherein the first connection line is projected to the XY plane at a right angle, and wherein each of the angle $\alpha$ and angle $\beta$ is calculated according to differences in positions of the left and right eyes of the user in the left-eye format picture and those in the right-eye format picture.

Where an origin O of the spatial rectangular coordinate system O-XYZ is located at the center point of the display screen, an X axis of the spatial rectangular coordinate system O-XYZ is parallel to a second connection line that connects a center point of a left edge and a center point of a right edge of the display screen, and a Y axis of the spatial rectangular coordinate system O-XYZ is parallel to a third connection line that connects a center point of a top edge and a center point of a bottom edge of the display screen.

Preferably, in one preferred embodiment of the present disclosure, the step S3 comprises:

the 3D scene generating unit controls an OpenGL3D scene rendering camera to move to a position corresponding to the parameters $\alpha$ and $\beta$, then controls the OpenGL3D scene rendering camera to move leftwards by an x distance to render and acquire the left visual-channel 3D scene, and then moves the OpenGL3D scene rendering camera rightwards by a 2x distance to render and acquire the right visual-channel 3D scene, where the parameter x is a preset parameter related to the depth of field.

Preferably, in another preferred embodiment summary, the step S4 is as follows:

the 3D scene generating unit controls an DirectX3D scene rendering camera to move to a position corresponding to the parameters $\alpha$ and $\beta$, then controls the DirectX3D scene rendering camera to move leftwards by an x distance to render and acquire the left visual-channel 3D scene, and then moves the DirectX3D scene rendering camera rightwards by a 2x distance to render and acquire the right visual-channel 3D scene, where the parameter x is a preset parameter related to the depth of field.

Of course, in other embodiments of the present disclosure, some other scene rendering camera may also be used to achieve the function of the OpenGL3D scene rendering camera and the DirectX3D scene rendering camera in the step S3, and the present disclosure has no limitation on this.

In the embodiment of the visual displaying method of the present disclosure described above, the display screen is a portrait-type display screen, with the corresponding two front-facing 3D cameras being preferably disposed at an upper-left corner and an upper-right corner of the vertical display screen respectively; the X axis of the spatial rectangular coordinate system O-XYZ is parallel to a connection line that connects a center point of a left edge and a center point of a right edge of the display screen, and the Y axis of the spatial rectangular coordinate system O-XYZ is perpendicular to the connection line that connects the center point of the left edge and the center point of the right edge of the display screen.

However, in another preferred embodiment of the present disclosure, the display screen is a landscape-type display screen, with the corresponding two front-facing 3D cameras being preferably disposed at an upper-right corner and a lower right corner of the horizontal display screen respectively; the X axis of the spatial rectangular coordinate system O-XYZ is parallel to a connection line that connects a center point of a left edge and a center point of a right edge of the display screen, and the Y axis of the spatial rectangular coordinate system O-XYZ is perpendicular to the connection line that connects the center point of the left edge and the center point of the right edge of the display screen. Of course, the first front-facing camera and the second front-facing camera may also be disposed at other positions depending on specific applications, and the present disclosure has no limitation on this.

In the aforesaid manner, the present disclosure provides the following benefits: as compared to the prior art, the display apparatus and the visual displaying method for simulating a holographic 3D scene according to the present disclosure capture human-eye 3D position information of human eyes by using two front-facing 3D cameras, calculate spatial coordinates of the human eyes according to the human-eye 3D position information, control the 3D human-eye tracking algorithm processing unit according to the spatial coordinates of the human eyes to generate a first signal for controlling the 3D scene generating unit to generate 3D scenes corresponding to the left visual channel and the right visual channel respectively and a second signal for controlling the working angle of the electronic grating so that the left visual-channel 3D scene is incident into the left eye of the user and the right visual-channel 3D scene is incident into the right eye of the user. Therefore, the present disclosure allows to see different 3D images at different view angles just as in the real world, thus achieving holographic displaying of an object or scene.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A display apparatus for simulating a holographic three-dimensional (3D) scene, comprising:
   a display screen;
   a first front-facing camera and a second front-facing camera, wherein the first front-facing camera is disposed at an upper-left corner of the display screen, the second front-facing camera is disposed at an upper-right corner of the display screen, and the first front-facing camera and the second front-facing camera are adapted to capture user-eye 3D position information;
   a 3D user-eye tracking algorithm processor electrically connected to the first front-facing camera and the second front-facing camera, being configured to, according to the user-eye 3D position information, generate a first signal for controlling a 3D scene generator to generate 3D scenes corresponding to a left visual channel and a right visual channel respectively, and generate a second signal for controlling a working angle of an electronic grating;
   the 3D scene generator, being electrically connected to the display screen and configured to receive the first signal, render and acquire the corresponding left visual-channel 3D scene and the corresponding right visual-channel 3D scene according to the first signal, and transmit the left visual-channel 3D scene and the right visual-channel 3D scene to the display screen for displaying; and
   the electronic grating, being configured to receive the second signal and adjust the working angle according to the second signal so that the left visual-channel 3D scene is incident into a left eye of a user and the right visual-channel 3D scene is incident into a right eye of the user;
   wherein the first front-facing camera is configured to acquire a left-eye format picture of the left and right eyes of the user, the second front-facing camera is configured to capture a right-eye format picture of the left and right eyes of the user, the 3D user-eye tracking algorithm processor calculates an angle α between a projection of a first connection line, which connects a midpoint between the left and right eyes and a center point of the display screen, on an XY plane of a spatial rectangular coordinate system O-XYZ and a Y axis, and calculates an angle β between the first connection line, which connects the midpoint between the left and right eyes and the center point of the display screen, and the projection of the first connection line on the XY plane, wherein the first connection line is projected to the XY plane at a right angle, and wherein each of the angle α and angle β is calculated according to differences between positions of the left and right eyes of the user in the left-eye format picture and those in the right-eye format picture;
   wherein an origin O of the spatial rectangular coordinate system O-XYZ is located at the center point of the display screen, an X axis of the spatial rectangular coordinate system O-XYZ is parallel to a second connection line that connects a center point of a left edge and a center point of a right edge of the display screen, and the Y axis of the spatial rectangular coordinate system O-XYZ is parallel to a third connection line that connects a center point of a top edge and a center point of a bottom edge of the display screen.

2. The display apparatus of claim 1, wherein the first signal is a signal comprising the parameters α and β, and the second signal is a signal comprising the parameter α.

3. The display apparatus of claim 2, wherein the 3D scene generator controls a scene rendering camera to move to a position corresponding to the parameters α and β, then controls the scene rendering camera to move leftwards by an x distance to render and acquire the left visual-channel 3D scene, and then moves the scene rendering camera rightwards by a 2x distance to render and acquire the right visual-channel 3D scene; wherein the parameter x is a preset parameter related to the depth of field.

4. The display apparatus of claim 2, wherein the electronic grating comprises: a first glass plate, a second glass plate, a liquid crystal layer and a controller, the first glass plate is provided with a first polarizer on a first surface thereof and a first ITO conductive layer on a second surface thereof that is opposite to the first polarizer, the second glass plate is provided with a second polarizer on a first surface thereof and a second ITO conductive layer on a second surface thereof that is opposite to the second polarizer, the first polarizer has a polarization direction perpendicular to that of the second polarizer, the second ITO conductive layer comprises a plurality of ITO electrodes arranged at equal intervals and black insulation bars disposed between adjacent ones of the ITO electrodes, the liquid crystal layer is sandwiched between the first ITO conductive layer and the second ITO conductive layer, the controller is configured to control ON/OFF of an alternating current (AC) voltage between the first ITO conductive layer and each of the ITO electrodes according to the second signal so that bright and dark stripes of the grating change in position adaptively to adapt to the user-eye position and, thus, the left visual-channel 3D scene displayed on the display screen is incident into the left eye of the user via the electronic grating and the right visual-channel 3D scene displayed on the display screen is incident into the right eye of the user via the electronic grating.

5. The display apparatus of claim 1, wherein the display apparatus is a computer.

6. The display apparatus of claim 1, wherein the display apparatus is a mobile phone.

7. A visual displaying method for simulating a holographic three-dimensional (3D) scene, comprising:
   capturing user-eye 3D position information of eyes of a user;
   calculating spatial coordinates of the eyes of the user according to the user-eye 3D position information;
   rendering and acquiring a corresponding left visual-channel 3D scene and a corresponding right visual-channel 3D scene according to the spatial coordinates of the eyes of the user, and transmitting the left visual-channel 3D scene and the right visual-channel 3D scene to a display screen for displaying; and
   adjusting a working angle of an electronic grating according to the spatial coordinates of the eyes of the user so that the left visual-channel 3D scene displayed on the display screen is incident into the left eye of the user via the electronic grating and the right visual-channel 3D scene displayed on the display screen is incident into the right eye of the user via the electronic grating;
   wherein the step of calculating spatial coordinates of the eyes of the user according to the 3D position information of the eyes of the user comprises:
   calculating an angle $\alpha$ between a projection of a first connection line, which connects a midpoint between the left and right eyes and a center point of the display screen, on an XY plane of a spatial rectangular coordinate system O-XYZ and a Y axis, and calculating an angle $\beta$ between the first connection line, which connects the midpoint between the left and right eyes and the center point of the display screen, and the projection of the first connection line on the XY plane, wherein the first connection line is projected to the XY plane at a right angle, and wherein each of the angle $\alpha$ and angle $\beta$ is calculated according to differences between positions of the left and right eyes of the user in a left-eye format picture of the left and right eyes of the user and those in a right-eye format picture of the left and right eyes of the user;
   wherein an origin O of the spatial rectangular coordinate system O-XYZ is located at the center point of the display screen, an X axis of the spatial rectangular coordinate system O-XYZ is parallel to a second connection line that connects a center point of a left edge and a center point of a right edge of the display screen, and the Y axis of the spatial rectangular coordinate system O-XYZ is parallel to a third connection line that connects a center point of a top edge and a center point of a bottom edge of the display screen.

8. The visual displaying method of claim 7, wherein the step of rendering and acquiring a corresponding left visual-channel 3D scene and a corresponding right visual-channel 3D scene according to the spatial coordinates of the eyes of the user, and transmitting the left visual-channel 3D scene and the right visual-channel 3D scene to the display screen for displaying comprises:
   controlling a scene rendering camera to move to a position corresponding to the parameters $\alpha$ and $\beta$, then controlling the scene rendering camera to move leftwards by an x distance to render and acquire the left visual-channel 3D scene, and then moving the scene rendering camera rightwards by a 2x distance to render and acquire the right visual-channel 3D scene; wherein the parameter x is a preset parameter related to the depth of field.

\* \* \* \* \*